Oct. 7, 1947.  E. J. SCHLATTER  2,428,435
VARIABLE ELEVATION WEDGE
Filed Aug. 13, 1946  3 Sheets-Sheet 1

INVENTOR
E. J. SCHLATTER

H. N. Foss
L. M. Mantell
ATTORNEYS

Oct. 7, 1947.　　　E. J. SCHLATTER　　　2,428,435
VARIABLE ELEVATION WEDGE
Filed Aug. 13, 1946　　　3 Sheets-Sheet 2

INVENTOR
E. J. SCHLATTER
H. N. Foss
L. M. Mantell
ATTORNEYS

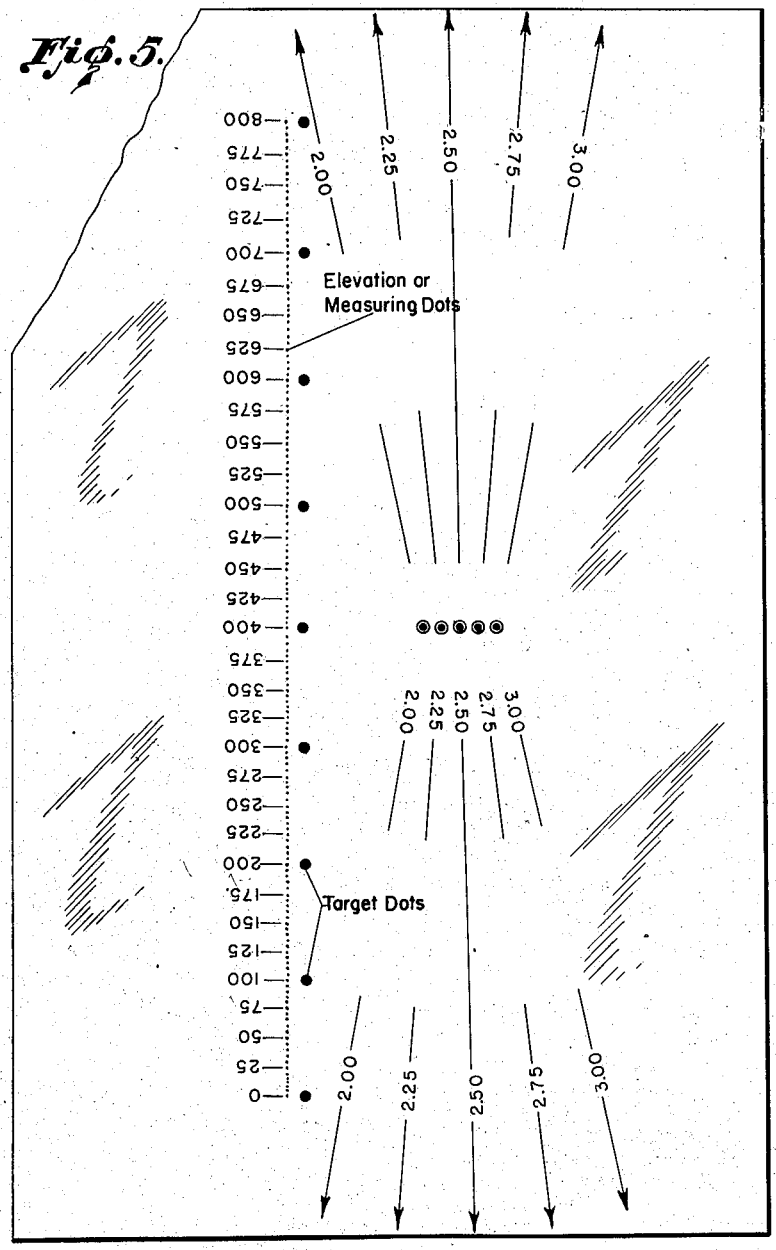

Patented Oct. 7, 1947

2,428,435

UNITED STATES PATENT OFFICE 2,428,435

VARIABLE ELEVATION WEDGE

Eugene J. Schlatter, Mount Rainier, Md.

Application August 13, 1946, Serial No. 690,191

14 Claims. (Cl. 33—1)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to transparencies to be placed over aerial photographs to be viewed through a stereoscope to determine relative differences in elevation.

One object of this invention is to provide a device of marked simplicity capable of determining differences in elevations between points on the photographs directly and preferably without reference to mathematical formulas and without significant further computation.

When two overlapping aerial photographs are oriented under a stereoscope one sees a stereoscopic model of the ground in which each object is a fused image of two photographic images, one of which appears on the left photograph and the other of which appears on the right photograph. The apparent height of the fused image is a function of the measured distance between the like images on the two photographs.

Spurr (Photogrammetric Engineering, June 1945, page 85) described a device which he had conceived for measuring these relative heights on aerial photographs. It consisted of one transparent sheet having on it two rows of small, closely spaced, black dots. The rows of dots, each containing 50 or more dots, sloped slightly toward each other, and thus the lateral distance between each pair of dots, between the two rows, varied slightly from that between the next pair of dots. This device was placed on top of a pair of overlapping aerial photographs which had been oriented under a stereoscope and was oriented until the two rows of dots appeared to the observer as one row of fused dots in space. Elevation differences were obtained by taking readings on successive points with the row of fused dots, and then applying mathematical formulae to these readings to deduce elevation differences in feet between the successive points. The application of mathematical formulae was necessary in order to provide for variations caused by different focal lengths of lenses in the original aerial camera which exposed the negatives, and for variations caused by the scale of the original photographs, the flying height of the airplane, and the distance the airplane traveled between the successive exposures.

My variable elevation wedge is so constructed that the necessity for applying mathematical formulae to obtain elevation differences in feet is eliminated.

The focal length of the lens used in the aerial camera does not in any way affect the measurements. The device shown in the drawings is based on the premise that the airplane was 14,125 feet above the average elevation of the terrain when the original pictures were taken. A different wedge may be prepared for other flight altitudes, as set forth below. The variable elevation wedge is designed for use in conjunction with any of the many types of lens stereoscopes. The flying height of 14,125 feet is within the tolerance required by United States Department of Agriculture specifications for aerial photographs at a scale of 1:20,000 with a lens having a focal length of 8¼ inches.

I attain these objects by the following device illustrated in the accompanying drawing, in which Figure 1 is a plan view of a frame that contains and supports the two transparencies.

Figures 4 and 5 are two transparencies designed to be superposed to constitute another form of the variable elevation wedge.

Figure 4:
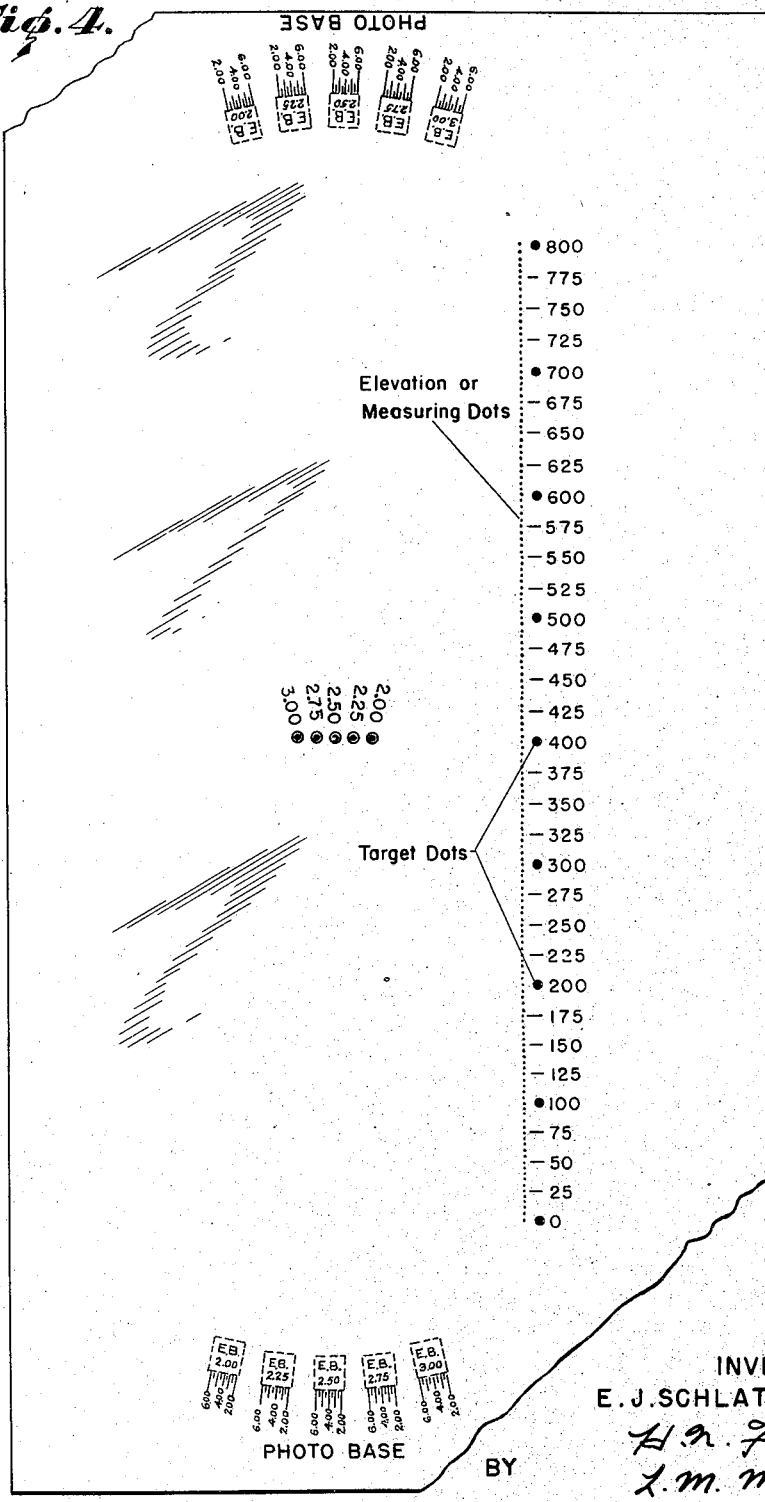

One form of the variable elevation wedge consists of two transparent sheets (Figs. 4 and 5), each having a system of lines and dots reproduced photographically on the under side. Figure 5, which has a row of dots and also a series of pointers on it, will hereafter be called the pointer sheet. Figure 4, which has a row of dots and a series of small curved scales, will be hereinafter called the scale sheet. The design and construction of this wedge is described below. The wedge of Figures 4 and 5 may be employed with any of the common types of simple lens stereoscopes, as follows:

The operator should first adjust the distance between the two lenses so that they are about the same distance apart as his eyes. This distance is known as the eye-base. Let us assume that an operator has found it to be approximately 2.60 inches.

Each sheet has a horizontal center line on which there are five small needle holes labelled 2.00, 2.25, 2.50, 2.75, and 3.00. These are eye-base distances. He should now select the needle hole on the pointer sheet which has a value nearest to his measured eye-base and place it exactly on top of the similarly numbered needle hole on the scale sheet. In this example the needle hole marked 2.50 on each sheet would be selected. A fine needle point should now be placed down through the two superimposed holes.

The photo-base should then be determined by measuring, with a scale, on each of the two photographs to be used, the distance between the photo-center and the image on the same photograph of the point which appears at the center of the next photograph. This measurement should be made on each photograph, and the two figures averaged. That average figure in inches will hereinafter be called the photo-base.

Now, returning to the two transparent sheets, the pointer sheet should be slightly rotated with respect to the scale sheet, the needle remaining placed through the two holes marked 2.50, until the pointer marked 2.50 rests at the correct reading on the scale marked E. B. 2.50. The scale is graduated directly in terms of photo-base and is labeled Photo-base. The graduations are such that the smallest interval equals .5 inch change of photo-base and they cover a range of photo-bases from 2.00 inches to 6.00 inches. For a check on the accuracy of the setting, the opposite side of the sheet also bears a pointer and a scale each labeled 2.50. When the sheets are correctly rotated, both pointers should rest at the same reading. The two sheets should be fastened together. The variable elevation wedge has now been adjusted for the observer's eye-base, and for use with the two particular photographs from which the photo-base was scaled. The needle should then be removed.

The two photographs should then be mounted on a flat surface for use under the lens stereoscope. To do this correctly, first mark with a small needle hole the center point on each photograph. Then similarly mark on each photograph the point corresponding to the center of the other photograph. Then, place these four marked points in exact line along the straight edge of a scale, and separate the photographs until the distance between the center point on one photograph and its marked position on the other photograph equals the previously measured eye-base, which in the case of this example is 2.50 inches. The four marked points must be in exact line along the edges of the scale or other straight edge. The photographs are then fastened down securely and the stereoscope placed over them. The line between the centers of the lenses should be approximately parallel to the line between the centers of the photographs, which are then rotated slightly until the photographs yield a good, clear, stereoscopic model through the lenses without any eyestrain.

The elevation wedge is then placed over the photographs so that the two rows of dots are at approximately right angles to the line joining picture centers. Then, for more exact orientation, while looking through the stereoscope, and viewing the photo-model, the wedge is rotated slightly in either direction until the auxiliary rows of nine large target dots spaced about ¾ inch apart are perfectly fused into a single row of dots which point directly toward the observer. The rows of dots should be held down flat. The wedge is now oriented in correct relation to the stereoscopic model.

Let us now assume that it is desired to find the difference in elevation between points A and B. The stereoscope should be moved until the two points are in the approximate center of the viewed stereoscopic field. Bringing the wedge in correct orientation with respect to the visible photo-model as described above and holding it down flat on the photographs, it is then moved about until one of the small fused dots in the row numbered 0 to 800 rests exactly on the ground at point A. The two adjacent dots, which are respectively 5 feet higher and 5 feet lower are checked to see if one appears slightly under the ground and the other appears slightly above the ground. This check is only applicable on level spots of ground; on slopes it will be of no value. By way of example, let us assume that the reading for point A is 435.

The same procedure should now be followed with respect to point B. We will assume it to be 485. The readings on A and B now indicate that point B is 50 feet higher than point A. The elevation wedge should be checked at the instant of each reading for correct orientation with respect to the photographic model by means of the nine large target dots. The fused dots should be clear and sharp at the instant any small dot is bedded on the ground. The row of small dots should also be clear and sharp at the instant a reading is taken. The distance between the lenses should not be disturbed at any time while a series of points are being read. If that distance is accidentally changed, the whole series of readings should be again taken. Furthermore, if it becomes necessary to "flip the photographs" to see the points whose readings are desired, the readings taken after the photographs are "flipped" will not be correctly related to those taken before the photographs were "flipped." For instance, assume that photograph 163 is mounted with part of the overlap on top of photograph 164 and ten points are read. Then suppose that the next ten points are in such a position that it is necessary to "flip" photograph 164 to get the overlap portion on top of photograph 163. The readings on the second ten points will be in correct relation to each other, but those readings should not be compared with the readings for the first ten points, since there will be a constant error caused by parallax difference due to "flipping" the photographs. In this connection, it might be mentioned that a parallax difference of .001 inch corresponds to an elevation difference of about 4 feet. An inordinate distortion of .01 inch can easily be caused in "flipping" the photographs which would correspond to about 40 feet in elevation.

In many cases, it may be impossible to see all of the area which is to be worked from one position of the lens stereoscope. In such cases, the photographs should be left fastened in the original positions, and the stereoscope moved toward or away from the observer, or to the left or right and reoriented over the next area. First the stereoscope should be moved to the general area so that the points to be measured are in the center of the field and set so that the center line between lenses is parallel to the line joining the centers of the two pictures. The stereoscope is then rotated slightly until sharp stereoscopic vision is obtained.

The following is an explanation of the principles upon which the wedge is based and of its design and construction:

The device is basically a means of varying the angle between the two rows of dots and of concurrently providing a means for varying the lateral distance between these rows of dots so as to accommodate the device to observers with different eye-bases, and to accommodate the device for use with various types of lens and mirror stereoscopes.

In planning and constructing a variable elevation wedge the total length of the row of dots has no special significance. The distance from the 0 dot to the 800 dot may be arbitrarily chosen. For convenient use, and for good visibility, the fused dots should not be spaced closer to each other than about .04 inch. This fact, coupled with the selected range of total elevation feet, in this case 800 feet, and with the fact that normal eyesight cannot perceive elevation differences of much less than 5 feet on aerial photographs of ordinary scales, leads to the following preferred specifications:

Interval between dots, 5 ft. elevation.
Entire range, 800 ft.

Number of dots, $\frac{800}{5} = 160 + 1$ for 0 end = 161 dots.

Average spacing between dots, about .04 inch.
Total length of fused row of dots,
about $160 \times .04 = 6.40$ inches.

For the above conditions, the distance between the 0 dot and the 800 dot should be about 6.40 inches.

The total length of the row of fused dots having been determined, the next step is the devising of means of setting off the required angle of inclination for given photo-bases.

For any photo-base:

$$\frac{\frac{1}{2} P \text{ (for 0-800 ft.)}}{\text{Length 0 to 800 in the row of dots}} = \text{the sine of the angle}$$

P = parallax increment in inches.

Figure 6:
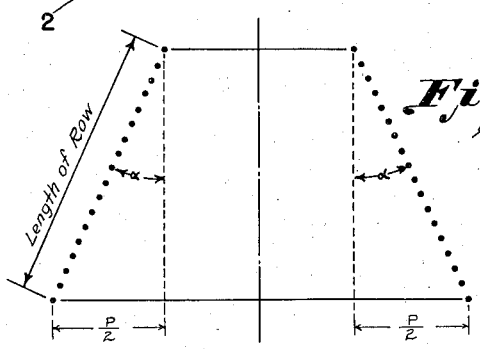
Figure 6 illustrates the calculation of the angle of inclination of each row of dots.

This angle is the angle of inclination of one row of dots with respect to a center line of the assembled wedge, being the angle $\alpha$ shown in Figure 6. Suitable graduations and pointers are disposed on the two sheets so that the desired angles of inclinations can be set off by rotating the sheets about respective eye-base centers and having graduations to correspond to angles of inclination.

Each set of graduations is made to correspond with a given eye-base and the graduations are on lines radiating from that particular eye-base. The angles of inclination for the various photo-bases are then calculated and graduations are placed on one sheet, and a pointer or pointing indicium is placed on the other sheet so that when the pointer points to a particular graduation a certain angle of inclination exists between the two rows of dots. Since the angle of inclination is solely a function of the increment of parallax, the flying height remaining constant, the graduations can be labeled in terms of photo-base just as readily as in terms of angle of inclination, and they are so labeled for convenience.

Each eye-base pivot center has an associated pointer on one sheet, and an associated scale on the other sheet correspondingly labeled. Pointers and scales are placed on both ends of the elevation wedge so that there may be a check on the setting of the angle of inclination. When a correct setting is made, the pivot centers should be exactly coincident and the two associated pointers should point to exactly the same graduation in the two associated graduated scales.

Large target dots are placed in two rows parallel to the rows of small measuring dots and about ⅛ inch away from the rows of measuring dots. The function of these dots is to provide a quick means of orienting the wedge. The large dots can be quickly fused. They are accurately located with respect to the rows of small dots, so that when the large dots are properly fused for stereoscopic vision, the rows of small dots will likewise be fused properly.

The purpose of the target marks is to provide a quick and accurate means of orienting the device correctly with relation to the stereoscope and the aerial photographs and to assure that each elevation mark in one row will be fused with its companion mark in the other row and that no inordinate fusion will occur between non-companion elevation marks.

The following table gives the increments of parallax that correspond to various photo-bases, measured on pictures taken from 14,125 feet altitude above mean terrain.

*Table I*

| Photo-base | 800 ft. elevation range | 400 ft. elevation range |
| --- | --- | --- |
| | *Inches* | *Inches* |
| 2.00 inches | .1201 | .0583 |
| 2.50 inches | .1501 | .0729 |
| 3.00 inches | .1801 | .0874 |
| 3.50 inches | .2101 | .1020 |
| 4.00 inches | .2402 | .1166 |
| 4.50 inches | .2702 | .1312 |
| 5.00 inches | .3002 | .1457 |
| 5.50 inches | .3302 | .1603 |
| 6.00 inches | .3602 | .1749 |

The parallax increment for 400 feet is also given in the third column, and it should be noted that in no case is the parallax increment for 400 feet exactly one-half of the parallax increment for 800 feet. Furthermore, if this table were mathematically extended to show the parallax increment for 0 to 5 ft., 5 ft. to 10 ft., 10 ft. to 15 ft., 15 ft. to 20 ft., 20 ft. to 25 ft, and so on, until the 800 ft. extremity is reached, it would be found that none of the increments for any one of these 5 ft. intervals is the same as the increment for any other 5 ft. interval in the 800 ft. range. Starting at the zero end, each space should be successively a small amount greater than the preceding one. When these gradually increasing spaces are correctly ascertained and the small dots located accordingly, each fused or "floating" dot will be 5 ft. higher or lower in elevation than the next one, when the correct photo-base has been taken into consideration.

For a photo-base of 2.00 inches, the parallax increment for 800 ft. should be .1201 inch, and when the rows are inclined toward each other so that the increment is .1201 inch the rows of dots will be set right for use with pictures whose photo-base is 2.00 inches.

Similarly, for a photo-base of 2.00 inches, the parallax increment for 800 ft. should be .1201 inch, and when the rows are inclined toward each other so that the increment is .1201 inch the rows of dots will be set right for use with pictures whose photo-base is 2.00 inches.

In each of the two cases cited, each "floating dot" will be 5 feet different in elevation from the adjacent dot. The same applies for all other photo-bases given in the table.

The curves scales and the pointers are so located on the two sheets that the desired over-all parallax is achieved when the correct pointer points exactly to a graduation on the scale representing a given photo-base. In other words, the over-all parallax increment defines a certain angle of inclination between the two rows of dots. Each scale is concentric about its associated eye-base center, and the corresponding pointer is a radial line emanating from that same eye-base center.

Varying the eye-base distance has no effect whatsoever on the photo-base setting. The two settings are entirely independent adjustments. By way of explanation, an eye-base setting of 2.00 associated with a photo-base setting of, for example, 3.50 inches, will give exactly the same angle of inclination between the two rows of dots, and accordingly the same over-all parallax increment, as will an eye-base setting of 3.00 associated with a photo-base setting of 3.50 inches.

The pivot points of the eye-base settings are exactly midway between corresponding graduated E. B. scales.

Figure 1:
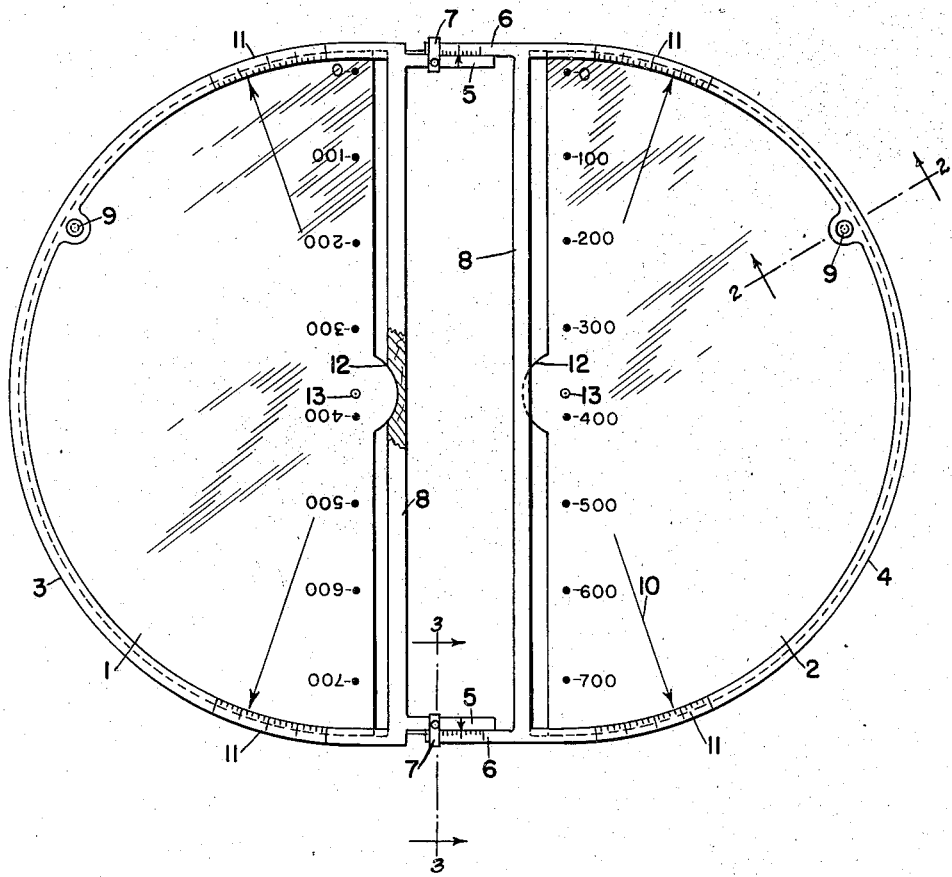
Figure 2:
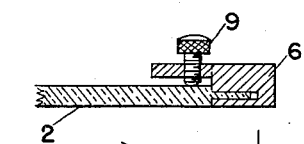
Figure 2 is a section of a clamp taken at line 2—2 in Figure 1.
Figure 3:
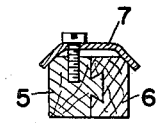
Figure 3 is a section of the fastener taken at line 3—3 in Figure 1.

In Figure 1 is illustrated a frame for the two transparent sheets 1 and 2. When this frame is employed it is not necessary to superpose the two transparencies. The frame comprises the two halves 3 and 4 having dovetailed parts 5 and 6, which are fastened together by two clamps 7, one of which is shown in section in Figure 3. The distance between the rows of dots is determined by spacing the two frames, thus providing adjustment for variation in eye-bases. A pointer on 5 and a graduated scale on 6 are provided for accurate adjustment. Each frame half is grooved to receive the transparency, as shown in Figure 2, and is held in place therein by a cross-bar 8 and fastener 9. Each transparency is provided with a projecting semi-circular part 12 which fits in a semi-circular groove in its respective cross-bar 8. There is sufficient clearance between the edges of the transparencies and the cross-bars 8 to permit the rotation of the sheets through the small angle required. When the transparencies are rotated about respective pivots 13, parts 12 rotate in the said semi-circular grooves. The angle between the row of dots and the cross-bar, and consequently between the row of dots on one sheet and the row on the other sheet, is determined by rotating each sheet in its groove until each pointer 10 registers with the desired point on the corresponding photo-base scale 11. Four identical photo-base scales are shown on the frames. The adjustment for the angle of inclination of the rows, which is the photo-base setting, is therefore independent of the eye-base setting. This form of the wedge obviates the need for superposing the two transparencies.

The parallax increment is calculated as follows:

$$P \text{ (parallax increment in inches)} = \frac{B(h)}{H-h}$$

B = Photo-base measured in inches.
H = flight altitude in feet.
h = any given interval of elevation, in feet.

*Example I*

For a flight altitude at 14,125 and an elevation interval of 800 feet, and a photo-base of 4.00 inches:

$$P = \frac{4(800)}{14,125 - 800} = .2402 \text{ inch}$$

*Example II*

Flight altitude _____ft__ 14,125
Photo-base _____inches__ 4.00
Elevation interval _____ft__ 400

$$P = \frac{4(400)}{14,125 - 400} = .1166 \text{ inch}$$

*Example III*

Flight altitude _____ft__ 14,125
Photo-base _____inches__ 4.00
Elevation interval _____ft__ 5

$$P = \frac{4(5)}{14,125 - 5} = .0014 \text{ inch}$$

Accordingly, the parallax increment from 0 on the row to the first dot above 0 is .0014 inch.

*Example IV*

Flight altitude _____ft__ 14,125
Photo-base _____inches__ 4.00
Elevation interval above 0 base _____ft__ 10

$$P = \frac{4(10)}{14,125 - 10} = .0028 \text{ inch}$$

If successive computations were made by intervals which were successively 5 ft. greater, the parallax for a 5 ft. interval near the 800 ft. end of the row of dots would be greater than the parallax for a 5 ft. interval near the 0 end of the row.

*Example V*

Flight altitude _____ft__ 14,125
Photo-base _____inches__ 4.00
Elevation interval above 0 base_____ft__ 795

$$P = \frac{4(795)}{14,125 - 795} = .2386 \text{ inch}$$

The parallax increment for 800 ft., previously figured, is .2402 For the 5 ft. interval from 795 to 800 ft., $P = .2402 - .2386 = .0016$ inch. As previously figured, for the 5 ft. interval from 0 to 5 ft. interval on the row of dots, P is .0014. This illustrates the difference in parallax for 5 ft. elevation interval in different places in the row of dots.

*Example VI*

Parallax calculation for a different photo-base.

Flight altitude _____ft__ 14,125
Photo-base _____inches__ 3.00
Elevation interval above 0 base _____ft__ 400

$$P = \frac{3(400)}{14,125 - 400} = .0874 \text{ inch}$$

*Example VII*

Flight altitude _____ft__ 14,125
Photo-base _____inches__ 3.00
Elevation interval above base _____ft__ 800

$$P = \frac{3(800)}{14,125 - 800} = .1801 \text{ inch}$$

The same formula can be used to calculate increments of parallax for any other flying height.

Having thus described my invention, I claim:

1. In a device for determining the difference in elevation between points on aerial photographs, two transparent superposable sheets, each provided with a like row of elevation marks, indicia along a row of said elevation marks comprising a scale corresponding to elevations, a pivot point mark on each of said sheets, a pointer on one of said sheets, and a photo-base scale on the other sheet, whereby upon superposing said pivot point marks and rotating one sheet with respect to the other to adjust the pointer with respect to said photo-base scale, the angle between said rows of marks is set, the distance between successive elevation marks being such that for each photo-base setting the sine of ½ said angle is ½ the parallax increment for the elevation interval between said marks divided by the said distance, said photo-base being the distance between the photo-center and the image on the same photograph of the point which appears at the center of the next overlapping photograph.

2. The device described in claim 1 and in which there is a row of pivot point marks on each sheet transverse to the row of elevation marks, and indicia along each row of pivot point marks comprising a scale of eye-bases, the smallest eye-base being nearest the elevation scale row of marks, pointers radiating from the eye-base pivot point marks on one of said sheets, photo-base scales on the other of said sheets for each of the eye-base radial pointers, whereby, upon superposing the corresponding pivot point marks, the distance between the rows of elevation marks is adjusted for individual eye-bases, and whereby, upon setting a pointer on the predetermined photo-base scale, the angle between the rows of elevation marks is adjusted in accordance with the predetermined photo-base said row of pivot point marks, said pointers, and said photo-base scales including the pivot point mark, pointer, and photo-base scale recited in claim 1.

3. The device described in claim 1 in which there are placed, in rows parallel to the elevation marks, larger target marks so located that when the target marks are fused for stereoscopic vision, the rows of elevation marks will likewise be fused.

4. In a device for determining the difference in elevation between points on aerial photographs, two transparent sheets each provided with a like row of elevation marks, indicia along a row of said elevation marks comprising a scale corresponding to elevations, a pivot point and a pointer on one of said sheets, a photo-base scale on the other sheet, whereby the angle between said rows of elevation marks is set upon rotating said one sheet about its pivot point and setting the pointer on the photo-base scale, the distance between successive elevation marks being such that for each photo-base setting the sine of ½ said angle is ½ the parallax increment for the elevation interval between said elevation marks divided by the said distance, said photo-base being the distance between the photo-center and the image on the same photograph of the point which appears at the center of the next overlapping photograph.

5. The device recited in claim 4, and in which means is provided to adjust the distance between the rows of elevation marks to correspond to the eye-base of the observer.

6. The device recited in claim 4 and having a frame to hold one of said transparent sheets, a second frame to hold the other sheet, and a means permitting adjustment of the frames toward and away from each other whereby the distance between the rows of elevation marks is adjusted to correspond to the eye-base of the observer.

7. The device described in claim 4 in which are placed, in rows parallel to the elevation marks, larger target marks so located that when the target marks are fused for stereoscopic vision, the rows of elevation marks will likewise be fused.

8. In a device for determining the difference in elevation between points on aerial photographs, two transparent superposable sheets each provided with a like row of elevation marks comprising a scale corresponding to elevations, superposable pivot point indicia on each of said sheets, a pointer on one of said sheets for each of said pivot points, and a photo-base scale on the other sheet for each of said pointers, whereby, upon superposing said pivot points and rotating one sheet with respect to the other to adjust a pointer with respect to its corresponding photo-base scale, the angle between said rows of marks is adjusted in accordance with the predetermined photo-base.

9. A device for use in determining the difference in elevation between points on aerial photographs comprising a transparent sheet having thereon a series of elevation marks, indicia for said series forming a scale corresponding to elevations, a pivot point mark on said sheet offset from said series of elevation marks, a pointing indicium on said sheet offset from said pivot point mark, and a second transparent sheet having thereon a series of elevation marks and indicia for said series forming a scale corresponding to elevations and having thereon a pivot point mark and an arcuate photo-base scale having the latter pivot point mark as center, whereby upon superposing the two sheets and said pivot point marks and setting the pointing indicium on a pre-determined graduation in the photo-base scale the angle between the two rows of elevation marks is fixed.

10. A device for use in determining the difference in elevation between points on aerial photographs comprising a transparent sheet having a row of elevation marks, indicia for said row forming a scale corresponding to elevations, a pivot point mark on said sheet offset from said row of elevation marks, a pointing indicium on said sheet offset from the pivot point mark and the row of elevation marks and a second transparent sheet having like elevation marks and indicia therefor, and a pivot point mark, and having a photo-base scale, whereby upon superposing the two sheets and said pivot point marks and setting the pointing indicium on a pre-determined graduation in the photo-base scale the angle between the two rows of elevation marks is fixed.

11. A device for use in determining the difference in elevation between points on aerial photographs comprising a transparent sheet having thereon a series of elevation marks, and indicia for said series forming a scale corresponding to elevations, a series of pivot point marks on said sheet transverse to the row of elevation marks, pointing indicia on said sheet offset from the row of elevation marks and from the row of pivot point marks, each pointing indicium corresponding to and correlating with an individual pivot point mark, and eye-base indicia on the sheet for the pointing indicia, each eye-base indicium corresponding to and correlating with a pivot point mark and its corresponding pointing indicium and a second transparent sheet having a like row of elevation marks and row of pivot point marks, and photo-base scales offset from the elevation marks for cooperation with said pointing indicia when pivot point marks on both sheets are in registration.

12. A device for use in determining the difference in elevation between points on aerial photographs comprising a transparent sheet having thereon a series of elevation marks and also indicia for said series forming a scale corresponding to elevations, a series of pivot point marks on said sheet transverse to the series of elevation marks, indicia for the series of pivot point marks comprising a scale of eye-bases, a plurality of photo-base scales on said sheet, there being a photo-base scale corresponding to and for use with each of the pivot point marks and a second transparent sheet having thereon a like series of elevation marks and a series of pivot point marks transverse to the elevation marks and having thereon a pointing indicium and eye-base indicium for each of the pivot point marks, whereby upon superposing the two sheets and the corresponding pivot point marks on both sheets and setting the pointing indicium corresponding to the pivot point marks on a pre-determined graduation in the photo-base scale corresponding to the superposed pivot point marks, the angle between the two rows of elevation marks is fixed.

13. The device described in claim 8 in which there are placed, alongside the elevation marks, a series of target marks larger than the elevation marks.

14. The device described in claim 9 in which there are placed, alongside the elevation marks, a series of target marks larger than the elevation marks.

EUGENE J. SCHLATTER.

REFERENCES CITED

The following references are of record in the file of this patent:

FOREIGN PATENTS

| Number | Country | Date |
|---|---|---|
| 620,651 | Germany | 1935 |